(12) United States Patent
Boivie et al.

(10) Patent No.: US 10,997,321 B2
(45) Date of Patent: May 4, 2021

(54) ENCRYPTION ENGINE WITH AN UNDETECTABLE/TAMPER PROOF PRIVATE KEY IN LATE NODE CMOS TECHNOLOGY

(71) Applicant: International Business Machines Corporation, Armonk, NY (US)

(72) Inventors: Richard H. Boivie, Monroe, CT (US); Eduard A. Cartier, New York, NY (US); Daniel J. Friedman, Sleepy Hollow, NY (US); Kohji Hosokawa, Kawasaki (JP); Charanjit Jutla, New York, NY (US); Wanki Kim, Chappaqua, NY (US); Chandrasekara Kothandaraman, New York, NY (US); Chung Lam, Peekskill, NY (US); Frank R. Libsch, White Plains, NY (US); Seiji Munetoh, Tokyo (JP); Ramachandran Muralidhar, Mahopac, NY (US); Vijay Narayanan, New York, NY (US); Dirk Pfeiffer, Croton on Hudson, NY (US); Devendra K. Sadana, Pleasantville, NY (US); Ghavam G. Shahidi, Pound Ridge, NY (US); Robert L. Wisnieff, Ridgefield, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/578,321

(22) Filed: Sep. 21, 2019

(65) Prior Publication Data

US 2020/0019732 A1    Jan. 16, 2020

Related U.S. Application Data

(62) Division of application No. 15/389,078, filed on Dec. 22, 2016, now Pat. No. 10,423,805.

(51) Int. Cl.
*G06F 21/72* (2013.01)
*G06F 21/75* (2013.01)
*G11C 16/00* (2006.01)

(52) U.S. Cl.
CPC ............. *G06F 21/72* (2013.01); *G06F 21/75* (2013.01); *G11C 16/00* (2013.01)

(58) Field of Classification Search
CPC ......... G06F 21/72; G06F 21/75; H04L 9/0866
See application file for complete search history.

(56) References Cited

U.S. PATENT DOCUMENTS 5,559,889 A * 9/1996 Easter .................... G06F 21/72
380/30
6,829,355 B2   12/2004 Lilly
(Continued)

FOREIGN PATENT DOCUMENTS

GB        2424089 A       9/2006

OTHER PUBLICATIONS

Kocher et al., "Differential power analysis." Advances in Cryptology—CRYPTO'99. Springer Berlin Heidelberg, 1999. pp. 1-10.
(Continued)

*Primary Examiner* — Dao Q Ho
(74) *Attorney, Agent, or Firm* — Joseph Petrokaitis; Otterstedt, Wallace & Kammer, LLP

(57) ABSTRACT

A private key of a public-private key pair with a corresponding identity is written to an integrated circuit including a processor, a non-volatile memory, and a cryptographic engine coupled to the processor and the non-volatile memory. The private key is written to the non-volatile memory. The integrated circuit is implemented in complementary metal-oxide semiconductor 14 nm or smaller technology. The integrated circuit is permanently modified, subsequent to the writing, such that further writing to the
(Continued)

non-volatile memory is disabled and such that the private key can be read only by the cryptographic engine and not off-chip. Corresponding integrated circuits and wafers are also disclosed.

2 Claims, 7 Drawing Sheets

(56) References Cited

U.S. PATENT DOCUMENTS

| | | | |
|---|---|---|---|
| 9,025,386 | B1 | 5/2015 | Iyer et al. |
| 10,423,805 | B2 | 9/2019 | Boivie et al. |
| 2006/0132285 | A1 | 6/2006 | Atkinson et al. |
| 2011/0140245 | A1* | 6/2011 | Lane .................. H01L 23/5329 257/620 |
| 2015/0381351 | A1 | 12/2015 | Kuenemund et al. |
| 2016/0148679 | A1 | 5/2016 | Yoshimoto et al. |

OTHER PUBLICATIONS

Kaiser,. "UICE: A High-Performance Cryptographic Module for SoC and RFID Applications." IACR Cryptology ePrint Archive 2007 (2007): 258. pp. 1-17.
Anonymous, "Physical unclonable function," https://en.wikipedia.org/wiki/Physical_unclonable_function, (2016). p. 1-5.
Clos network. Downloaded from https://en.wikipedia.org/wiki/Clos_network on Aug. 27, 2016. pp. 1-5.
EFuse. Downloaded from https://en.wikipedia.org/wiki/EFUSE on Aug. 28, 2016. pp. 1-2.
Gary Friedman et al., The Trustworthy Digital Camera: Restoring Credibility to the Photographic Image. NASA, Washington, Technology 2003: The Fourth National Technology Transfer Conference and Exposition, vol. 2; p. 130-435.
Norm Robson et al., Electrically Programmable Fuse (eFUSE): From Memory Redundancy to the Autonomic Chips (Abstract Only) Custom IC Circuits Conference Sep. 2007, Downloaded from http://ieeexplore.ieee.org/document/4405850/ on Aug. 28, 2016. pp. 1-3.
Message authentication code. Downloaded from https://en.wikipedia.org/wiki/Message_authentication_code on Aug. 27, 2016. pp. 1-5.
SHA2. Downloaded from https://en.wikipedia.org/wiki/SHA2 on Aug. 27, 2016. pp. 1-12.
NSA, "Descriptions of SHA-256, SHA-384, and SHA-512," Cover pages and pp. 1-48, believed available at least as early as Nov. 8, 2001.
International Business Machines Corporation, Armonk, New York, USA, "CryptoCards: IBM Systems cryptographic hardware products," downloaded from http://www03.ibm.com/security/cryptocards/ on Sep. 20, 2016 pp. 1-5.
Anonymous, Wikipedia Article "IBM 4764," downloaded from https://en.wikipedia.org/wiki/IBM_4764 on Sep. 20, 2016, p. 1.
R. F. Rizzolo et al., IBM System z9 eFUSE applications and methodology, IBM J. Res. & Dev. vol. 51 No. 1/2 Jan./Mar. 2007, pp. 65-75.
Anonymous, Wikipedia Article "Hardware Security Module," downloaded from https://en.wikipedia.org/wiki/Hardware_security_module on Sep. 20, 2016 pp. 1-4.
Janakiraman Viraraghavan et al., 80Kb 10ns Read Cycle Logic Embedded High-K Charge Trap Multi-Time-Programmable Memory Scalable to 14nm FIN with no Added Process Complexity, 2016 Symposium on VLSI Circuits Digest of Technical Papers, pp. 18-19, Jun. 15-17, 2016 Hilton Hawaiian Village, Honolulu, HI.
Anonymous, Oracle, System Administration Guide: Security Services, How to Generate a Public/Private Key Pair for Use With Solaris Secure Shell, downloaded from http://docs.oracle.com/cd/E1925301/8164557/sshuser33/index.html on Nov. 16, 2016 pp. 1-3.
Mathew et al., A 4fJ/bit Delay-Hardened Physically Unclonable Function Circuit with Selective Bit Destabilization in 14nm Tri-gate CMOS, Jun. 2016, IEEE (Year: 2016).
Boivie et al., unpublished U.S. Appl. No. 16/578,319, filed Sep. 21, 2019, Encryption Engine With an Undetectable/Tamper-Proof Private Key in Late Node CMOS Technology, pp. 1-24 plus 7 sheets of drawings.
Paul J. Otterstedt, List of IBM Patents or Patent Applications Treated as Related, Oct. 11, 2019, pp. 1-2.
Jing Li et al, 1 Mb 0.41 μm2 2T-2R cell nonvolatile TCAM with two-bit encoding and clocked self-referenced sensing, 2013, IEEE Xplore, p. 104-105 (Year: 2013).

* cited by examiner

| MODE | WL | BL | MSLN | BL |
|---|---|---|---|---|
| PROGRAM | 2V | 0V | 1.5V | 1.5V |
| ERASE | -1.5V | 1.5V | 1.5V | 1.5V |
| SENSE | 1V | 0V | 0V | 0V |

ENCRYPTION ENGINE WITH AN UNDETECTABLE/TAMPER PROOF PRIVATE KEY IN LATE NODE CMOS TECHNOLOGY

CROSS-REFERENCE TO RELATED APPLICATIONS

This application is a division of U.S. patent application Ser. No. 15/389,078 filed Dec. 22, 2016, the complete disclosure of which is expressly incorporated herein by reference in its entirety for all purposes.

FIELD OF THE INVENTION

The present invention relates to the electrical, electronic and computer arts, and, more particularly, to secure hardware and the like.

BACKGROUND OF THE INVENTION

Public-private key encryption is used extensively for secure communications and electronic signatures. The security of the private key is a concern: it is desirable that the private key never be detected by any adversary, whether through reverse engineering or otherwise. In many applications, the private key is stored in a non-volatile memory, and on a separate chip (i.e., separate from the main microprocessor), with its own access port. This makes it possible for an adversary to access the private key. One reason to store the private key on a separate non-volatile memory is that advanced node (14 nm and beyond) complementary metal oxide semiconductor (CMOS) technologies do not have a dense non-volatile storage device that is resistant to reverse engineering. For example, advanced node CMOS technologies do include electrical fuse structures. However, such structures can be reverse engineered (and the key uncovered).

SUMMARY OF THE INVENTION

Principles of the invention provide techniques for an encryption engine with an undetectable and/or tamper-proof private key in late node CMOS technology. In one aspect, an exemplary method includes writing a private key of a public-private key pair with a corresponding identity to an integrated circuit including a processor, a non-volatile memory, and a cryptographic engine coupled to the processor and the non-volatile memory. The private key is written to the non-volatile memory. The integrated circuit is implemented in complementary metal-oxide semiconductor 14 nm or smaller technology. A further step includes permanently modifying the integrated circuit, subsequent to the writing, such that further writing to the non-volatile memory is disabled and such that the private key can be read only by the cryptographic engine and not off-chip.

In another aspect, an exemplary integrated circuit includes a processor; a non-volatile memory storing a private key of a public-private key pair; and a cryptographic engine coupled to the processor and the non-volatile memory. The integrated circuit is implemented in complementary metal-oxide semiconductor 14 nm or smaller technology. The integrated circuit is permanently configured such that further writing to the non-volatile memory, beyond the private key, is disabled. The integrated circuit is permanently configured such that the private key can be read only by the cryptographic engine and not off-chip.

In still another aspect, an exemplary wafer has a plurality of integrated circuits formed thereon and separated from each other with dicing channels. Each of the integrated circuits in turn includes a processor; a non-volatile memory storing a private key of a public-private key pair; and a cryptographic engine coupled to the processor and the non-volatile memory. The integrated circuit is implemented in complementary metal-oxide semiconductor 14 nm or smaller technology. The integrated circuit is configured such that circuitry enabling writing to the non-volatile memory runs through a given one of the dicing channels for destruction upon subsequent dicing. The integrated circuit is configured such that the private key can be read only by the cryptographic engine and not off-chip, subsequent to the dicing.

In yet a further aspect, an exemplary integrated circuit includes a processor; a non-volatile memory storing a private key of a public-private key pair; a cryptographic engine coupled to the processor and the non-volatile memory; and an unblown electrical fuse structure. The integrated circuit is implemented in complementary metal-oxide semiconductor 14 nm or smaller technology; the integrated circuit is configured such that further writing to the non-volatile memory, beyond the private key, is disabled when the fuse structure is blown; and the integrated circuit is configured such that subsequent to blowing of the fuse structure, the private key can be read only by the cryptographic engine and not off-chip.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

Some aspects of the invention or elements thereof can be implemented, at least in part, in the form of a computer program product including a computer readable storage medium with computer usable program code for performing appropriate method steps (e.g., key generation, control of fuse-blowing or semiconductor fabrication processes). Furthermore, one or more embodiments of the invention or elements thereof can be implemented, at least in part, using a system (or apparatus) including a memory, and at least one processor that is coupled to the memory and operative to perform appropriate method steps (e.g., key generation, control of fuse-blowing or semiconductor fabrication processes). Furthermore, aspects of the invention could be used to provide an encryption engine for such an apparatus or system. Yet further, in another aspect, at least some aspects one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments provide enhanced security for a private key implemented in late node CMOS technology.

These and other features and advantages of the present invention will become apparent from the following detailed description of illustrative embodiments thereof, which is to be read in connection with the accompanying drawings.

BRIEF DESCRIPTION OF THE DRAWINGS

FIG. 6 depicts a general purpose computer system that could be used, for example, to generate suitable public-private key pairs with corresponding identities; to control manufacturing process steps such as dicing; to control fuse blowing; and the like.

DETAILED DESCRIPTION OF PREFERRED EMBODIMENTS

Figure 1:
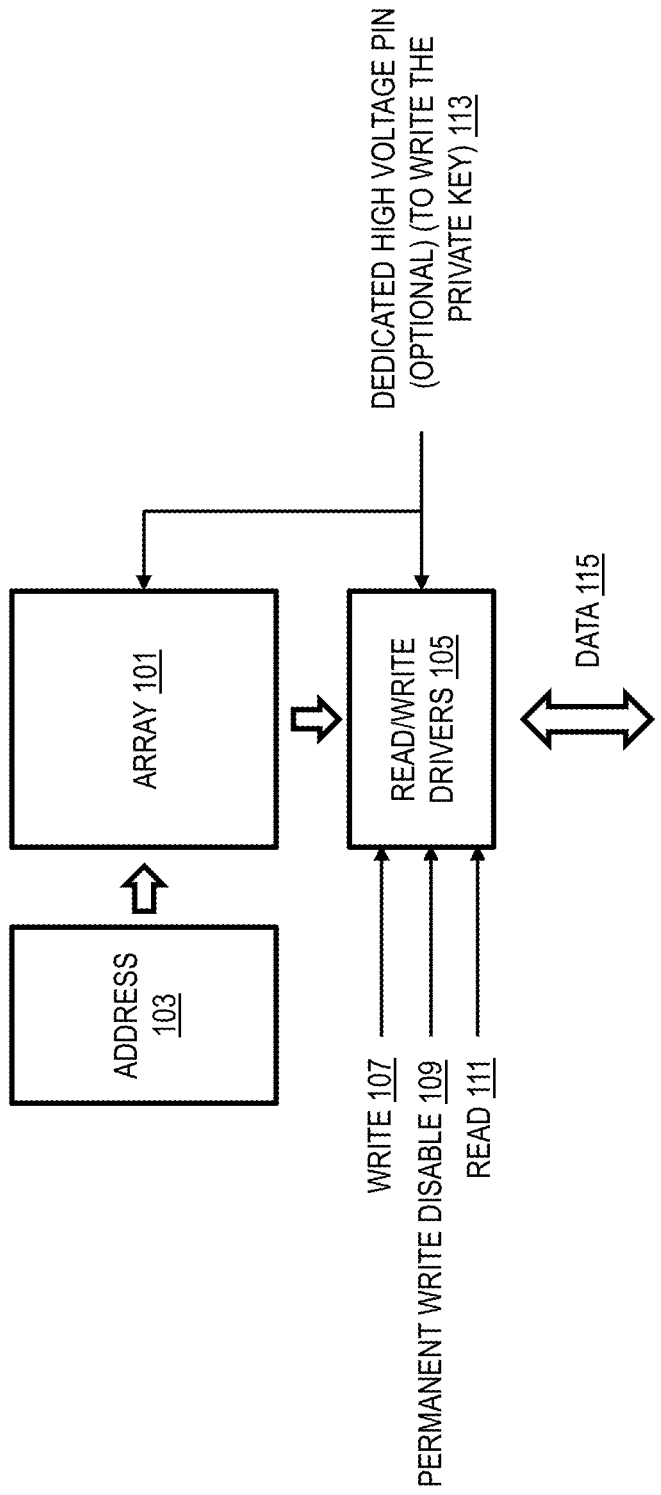
FIG. 1 shows an array structure for one-time write of a private key, in accordance with an aspect of the invention.

As noted, public-private key encryption is used extensively for secure communications and electronic signatures. The security of the private key is a concern: it is desirable that the private key never be detected by any adversary, whether through reverse engineering or otherwise. In many applications, the private key is stored in a non-volatile memory, and on a separate chip (i.e., separate from the main microprocessor), with its own access port. This makes it possible for an adversary to access the private key. One reason to store the private key on a separate non-volatile memory is that advanced (14 nm and beyond) node complementary metal oxide semiconductor (CMOS) technologies do not have a dense non-volatile storage device that is resistant to reverse engineering. For example, advanced node CMOS technologies do include electrical fuse structures. However, such structures can be reverse engineered (and the key uncovered).

It should be noted that co-assigned U.S. Pat. No. 9,025,386 to Iyer et al. discloses an EMBEDDED CHARGE TRAP MULTI-TIME-PROGRAMMABLE-READ-ONLY-MEMORY FOR HIGH PERFORMANCE LOGIC TECHNOLOGY; its complete disclosure is expressly incorporated herein by reference in its entirety for all purposes. One or more embodiments of the present invention advantageously employ a storage mechanism to program a cell in late node technology, as disclosed in Iyer et al.

In particular, in one or more embodiments, the aforementioned storage mechanism of Iyer et al. is adapted to store a private key, via a one-time program capability (i.e., after the write of the private key, the write circuit is disabled). One or more embodiments provide an authentication and/or encryption engine that uses the stored private key to carry out an authentication and/or encryption operation. One pertinent and advantageous aspect of one or more embodiments is that the private key can never be altered or detected, either by "reverse engineering" (such as electron microcopy or focused ion beam (since the dimensions are beyond any existing capability)), or through radio frequency or power supply signatures (by using 2 bits, 01 and 10, to hole every bit of the key).

At the 14 nm technology node and beyond, the device footprint is very small. For example, in 14 nm CMOS technologies, the metal-1 ("M1") pitch is at 64 nm, and the contacted devices are at a pitch of 70-80 nm. Devices at these dimensions are near impossible to probe by electrical techniques, and if a 2-bit encoding of the key is employed, then probing by looking at the electromagnetic (EM) spectrum (i.e. PICA technique), or through power supply analysis, will also be difficult or impossible (because PICA can't spatially resolve fine enough with the 2-bit encoding). If there is a way to induce a shift in device characteristics at minimum pitch (e.g. threshold voltage shift or induced oxide breakdown), and such a change is permanent, then this will be a path to implement one time programmable read-only memory such that it can never be reverse engineered. One or more embodiments use such a system to securely hold the private key.

In 14 nm technology, methods to induce permanent change have been reported. For example, consider the paper by Janakiraman Viraraghavan et al. entitled "80 Kb 10 ns Read Cycle Logic Embedded High-K Charge Trap Multi-Time-Programmable Memory Scalable to 14 nm FIN with no Added Process Complexity," 2016 Symposium on VLSI Circuits Digest of Technical Papers pages 18-19, expressly incorporated herein by reference in its entirety for all purposes. Techniques disclosed in the Viraraghavan et al. paper provide one possible path to induce threshold shift. Another possibility is to employ thin oxide breakdown (using circuits made by the thick-oxide process), as an alternate path to change the device characteristics.

Accordingly, in one or more embodiments, at test time, and in a secure site, public-private key pairs are generated (and a related ID to keep track of each pair). Using a dedicated circuit, the private key is written on the target chip (i.e. the processor), and then the write circuit is permanently disabled (e.g., through an electrical fuse). Thus, using a support circuit (e.g. a crypto-engine), encryption/decryption operations can be carried out using the private key, the identity of the processor can be verified (through response to the challenge question), and secure communication can be established. The circuit is designed to never output its private key.

One or more embodiments use devices in advanced node CMOS technology (14 nm and beyond i.e. smaller nodes such as 10 nm or 7 nm) as one-time programmable memory (through threshold shift or oxide damage) to hold a secret or private key as part of a crypto-engine. One or more embodiments further provide a circuit macro to program the one time minimum size device memory with the private key, and then after the write operation, disable the circuit through an electrical fuse or dedicated circuit to prevent a second write to the array (i.e. write disable bit set after the first write). One or more embodiments employ a dedicated program pin for the private key and/or a dedicated pin for high voltage supply to do the write operation. The dedicated pins are disabled or cut-off after the write operation via an electrical fuse, or are cut-off during the dicing process.

One or more embodiments further provide an "Authentication Circuit Macro" wherein a circuit and/or engine carry out encryption/decryption using the stored private key, and never transmit the stored private key. The circuit can become a standard macro in a hardware description language, or something similar, for CAD circuit design and manufacturing. The designer can just call the engine up when designing a new microprocessor.

Even further, one or more embodiments provide a secure facility and process to generate private—public keys and a corresponding chip ID during the test of the wafer, writing the private key on the chip and disabling the write circuit permanently.

Referring now to FIG. 1, note an array structure 101 for the one-time write of the private key. Optionally, extra pins can be added to disable the write circuit after the private key is written to array 101. In an alternative approach, an external supply is used to program the array, after which that supply line is disabled. In particular, data 115 is to be written to or read from array 101 at an address 103. When write enable signal 107 is applied to read/write drivers 105, the array 101 is configured for writing. After the key is written into the array 101, the permanent write disable signal 109 is applied to the read/write drivers 105, causing the write circuit to be permanently disabled such that the private key remains permanently in array 101. The key can then be read out when needed by specifying its address 103 and enabling the read enable signal 111. In the aforementioned alternative approach, a dedicated high voltage pin 113 is provided to write the private key into the array 101, and is disabled after the writing of the private key into the array 101 is completed.

Figure 2:
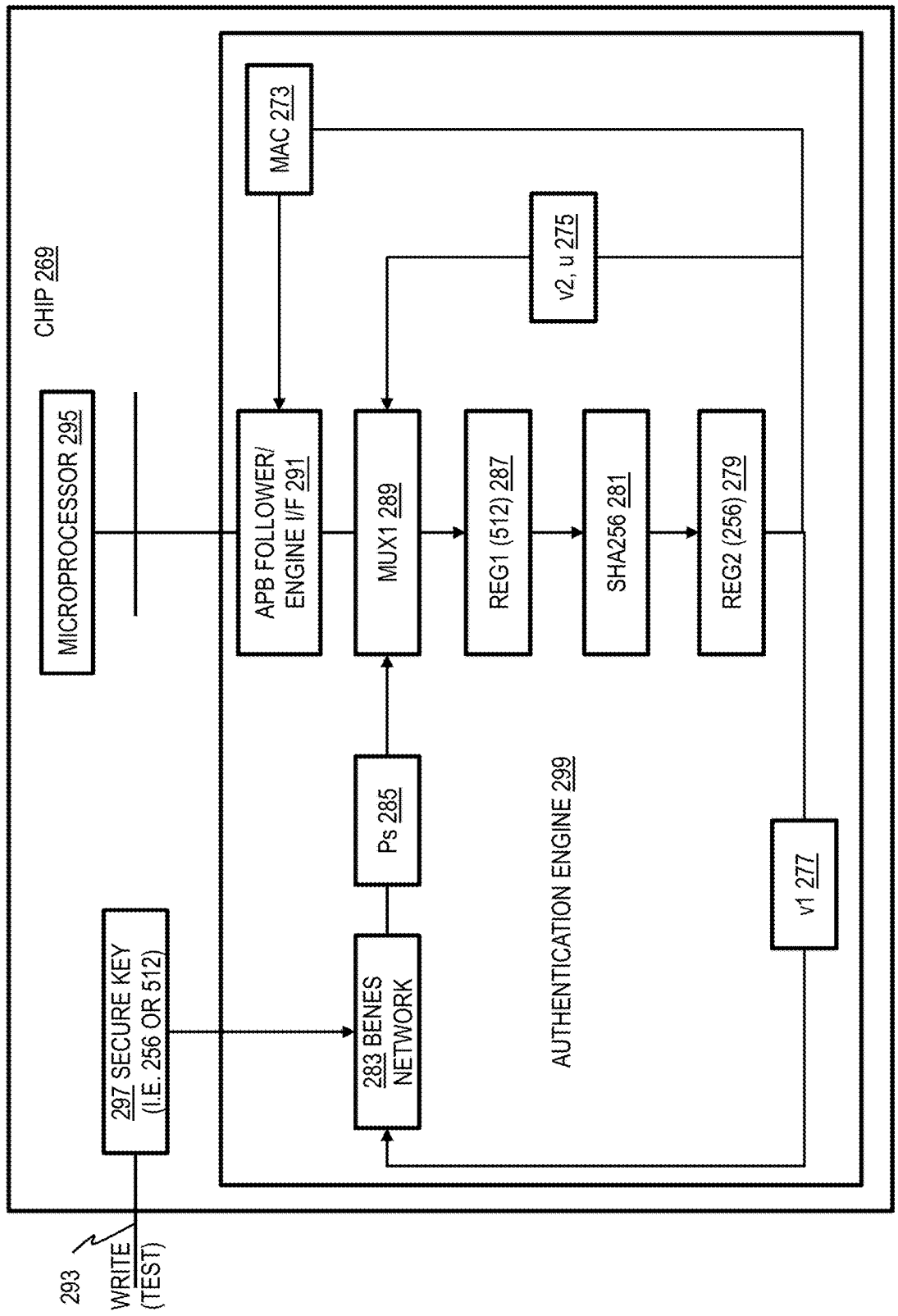
FIG. 2 shows exemplary architecture of an authentication engine, in accordance with an aspect of the invention.

FIG. 2 shows an exemplary architecture of an authentication engine 299, coupled to a microprocessor 295 and secure non-volatile memory storing key 297, in accordance with an aspect of the invention. The engine is configured to carry out SHA2 and Benes Network operations, using the stored private key 297. The engine can be integrated on a single chip 269 including key 297 stored in an array 101 accessible to microprocessor 295. The engine answers challenge questions posed by the processor 295, for identity authentication (other embodiments could undertake encryption-decryption operations). In one or more embodiments, the write (test) line 293 is the same as write enable port 107 in FIG. 1.

Microprocessor 295 communicates with the engine via APB follower 291 (also referred to as an "engine interface"). Multiplexer 289 selectively provides to a first, 512 bit register 287:

the parameter Ps 285 output by Benes network 283;
the signal from APB follower (engine interface) 291; and
the parameters v2, u discussed below.

Block 281 performs the SHA-256 cryptographic hash function on the data in first register 287, and outputs the result (i.e. hash) to second, 256-bit register 279. The parameter v1 is provided from second register 279 to Benes network 283, as seen at 277; the aforementioned parameters v2, u are provided from second register 279 to multiplexer 289, as seen at 275; and a message authentication cryptogram (MAC) 273 is provided from second register 279 to APB follower (engine interface) 291. The skilled artisan will appreciate that the elements 273, 275, 277 are used and generated in a recursive manner.

Figure 3:
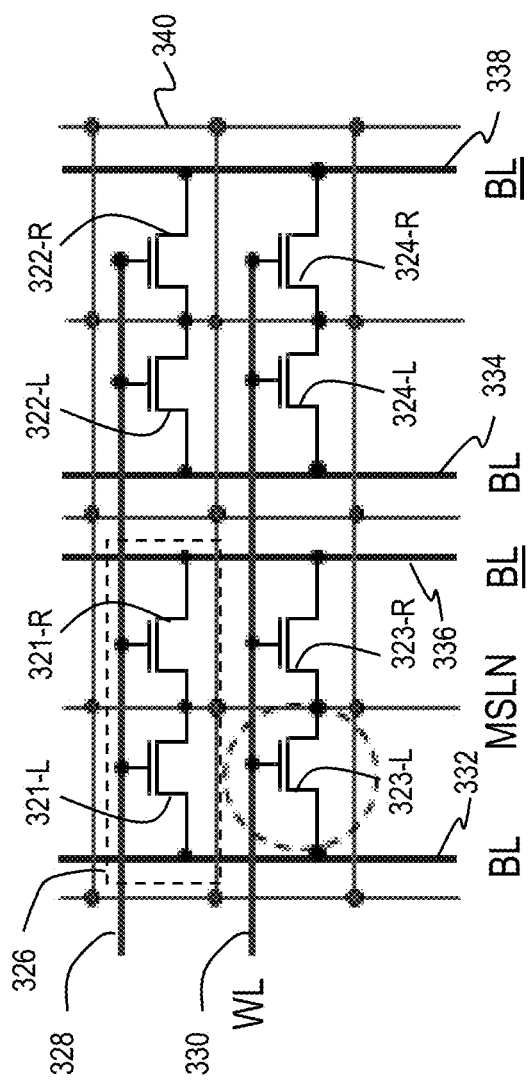
FIG. 3 shows exemplary memory cell architecture from co-assigned U.S. Pat. No. 9,025,386, adapted for use with one or more embodiments of the invention.

FIG. 3 shows a portion of an exemplary implementation of array 101 employing techniques as disclosed in the aforementioned U.S. Pat. No. 9,025,386 to Iyer et al. In particular, a charge trap memory array includes a plurality of NMOS devices 321-L, 321-R; 322-L, 322-R; 323-L, 323-R; and 324-L, 324-R, configured in a twin NMOS approach. Two NMOS devices (e.g., 321-L and 321-R) serve one bit memory cell 326, wherein one of the two NMOS (e.g., leftmost or 321-L in the case of cell 326) traps the charge to increase the threshold voltage rather than the other NMOS (e.g., rightmost or 321-R in the case of cell 326) of the pair. A plurality of memory cells each having two NMOS are arranged in the two dimensional matrix. All the cells in each row are coupled to the same wordline (WL) 328, 330 running in a first direction. All the left sides of the pairs of NMOS within each column are coupled to the same true bitline (BL) 332 or 334, and further, all the right sides of the two NMOS in each column are coupled to the same complementary bitline (BL) 336, 338. The BLs run in a second direction orthogonal to the WL first direction. Source lines are meshed in the entire array to create a Meshed Source-Line Network (MSLN) 340.

Referring to table 342 of FIG. 3, when in a programming mode, the memory cell can be selectively programmed by applying target voltages (e.g., 2V) to the corresponding WL, and either the true or the complementary BL (e.g., 1.5 V), with 1.5 V on the MSLN. When in an erase mode, the memory cell can be selectively erased by applying −1.5 V to the corresponding WL, and +1.5V to the true and complementary BL as well as the MSLN. When in a sense mode, the memory cell can be selectively sensed by applying +1 V to the corresponding WL, and 0 V to the true and complementary BL as well as the MSLN. Table 342 of FIG. 3 thus represents exemplary circuit designs implemented in 32 nm, 22 nm and 14 nm technology.

Figure 4A:
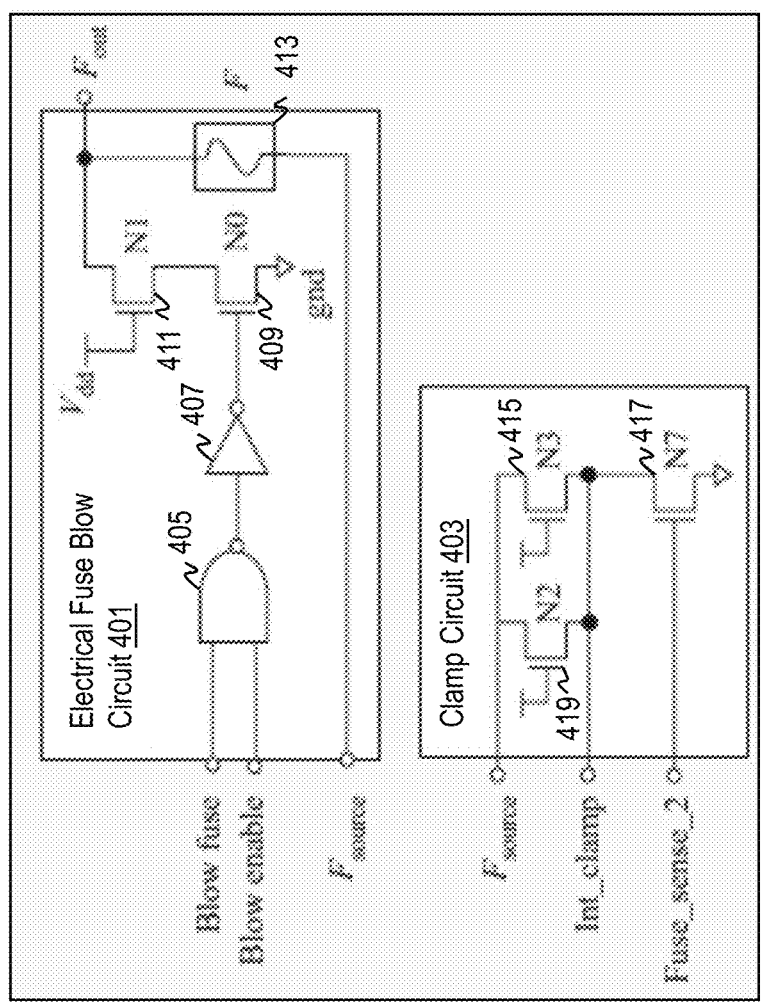
FIGS. 4A and 4B show write disabling techniques using an electrical fuse, in accordance with an aspect of the invention.
Figure 4B:
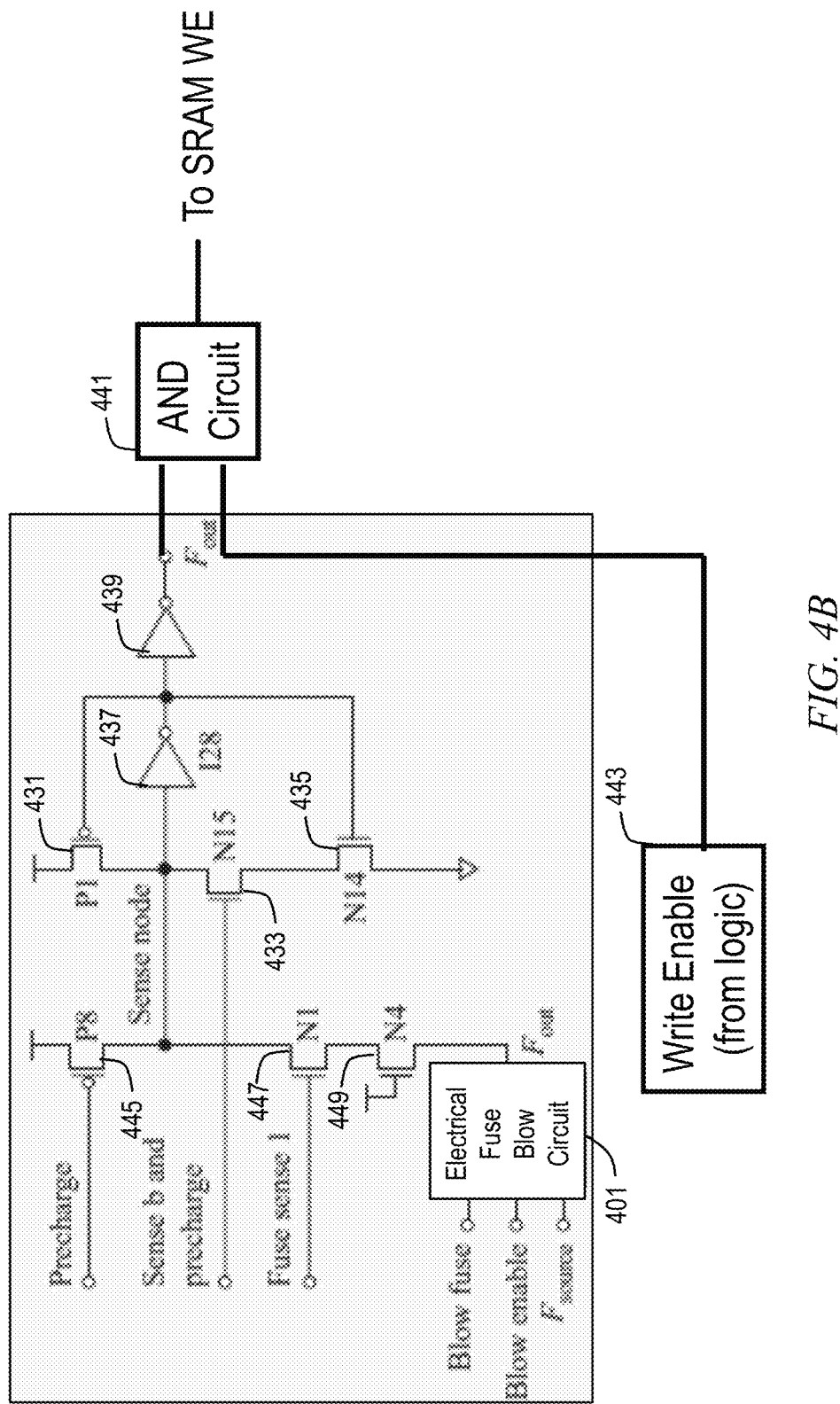

FIGS. 4A and 4B show electrical fuse programming circuitry and sense circuitry, connected to an SRAM (static random access memory) Write Enable WE (output of AND circuit 441). Only if the fuse 413 is blown (and "Fuse sense" is high), then $F_{out}$ will be high. If WE (write enable 443) from the logic is high, then WE to the SRAM will be high (output of AND circuit 441), and the write operation can proceed. Reference is made to R. F. Rizzolo et al., "IBM System z9 eFUSE applications and methodology," IBM J. RES. & DEV. VOL. 51 NO. 1/2 JANUARY/MARCH 2007, pages 65-75, expressly incorporated herein by reference in its entirety for all purposes.

In particular, the programming circuitry includes two large-series n-FET transistors designed to draw a large amount of current (10-15 mA), as shown in FIG. 4A. The sense circuitry is the structure that reads the state of the polysilicon fuse, as shown in FIG. 4B. Suitable control logic (omitted to avoid clutter) controls the fuse program and fuse read operations. An external voltage source, called $F_{source}$, is used to program fuse elements (e.g. at 3.3 V) and read them (at 0.0 V).

In one or more embodiments, 10-15 mA of current from the $F_{source}$ supply are used to blow a fuse (F) 413. A series n-FET configuration (N0 and N1, 409 and 411 in FIG. 4A) using thick-oxide n-FETs is employed, so that the programming n-FETs are not damaged during application of the high-voltage external supply. In a non-limiting example, the requirement that the programming n-FETs be able to draw 10-15 mA of current through an approximately 200-a polysilicon fuse resistor implies these n-FETs to be approximately 50 μm wide. The current requirements during the fuse program and fuse read are significant. This places constraints on the $F_{source}$ wiring in the design. The on-chip wiring for the $F_{source}$ signal is made, in one or more embodiments, such that the maximum resistance is less than 5Ω, and the off-chip wiring is implemented such that the total resistance back to the supply (ground or high-voltage supply) was less than 5Ω.

In one or more embodiments, the sense circuit of FIG. 4B interprets any polysilicon fuse of less resistance than 500Ω as "unprogrammed" and any fuse of greater resistance than 5 kΩ as "programmed." A further aspect of the sense circuitry in one or more embodiments is that it does not draw more than about 500 µA of current through the fuse to prevent reverse electromigration from occurring. This current limitation sets the size of p-FET P8 445 in FIG. 4B.

In addition to the above design constraints, the sense circuitry should be protected during application of the high-voltage supply, since the oxide breakdown of all FETs in this process, in exemplary embodiments, is less than 3 V. This implies thick-oxide isolation n-FETs (N1 and N4 447, 449 in FIG. 4B) to protect against destruction of the sense circuit during the application of the high programming voltage. To help stabilize the $F_{source}$ voltage during a fuse sense event, an n-FET pulldown (N2, N3, N7 419, 415, 417 in clamp circuit 403 in FIG. 4A) is added on the $F_{source}$ side of the polysilicon resistor to minimize any "ground bounce" that would occur because of the $F_{source}$ signal. To prevent the N2 and N3 transistors from breaking down during the programming, the node between N3 and N7 should be brought up to some intermediate voltage Int_clamp (such as, say, 1.5V) during the programming (referred to as "clamp voltage")—otherwise, in one or more embodiments, the voltage across N2 and N3 will be >3.3 V and they will break down.

Since the $F_{source}$ net connects to a chip I/O and then to the outside world, electrostatic discharge (ESD) protection should be provided. The per-fuse n-FET clamp structure 403 of FIG. 4A can be employed for ESD protection in one or more embodiments.

The control circuitry for the electrical fuse is fairly simple, including a single latch for each fuse element, tied to the "blow select" input pin, used to select which fuse is to be programmed if the "blow enable" signal is set. The blow enable signal is set by another latch that is controlled independently of the blow select latches. The remaining control logic includes a set of latches and a small state-machine that goes through the sequence shown in the table below to control the fuse sense.

| Time | Pre-charge | Sense b and pre-charge | Fuse sense 1 | Fuse sense 2 |
|---|---|---|---|---|
| 0 | 1 | 1 | 0 | 0 |
| 1 | 0 | 0 | 0 | 0 |
| 2 | 0 | 0 | 1 | 1 |
| 3 | 1 | 0 | 1 | 1 |
| 4 | 1 | 1 | 0 | 0 |

During this input signal sequence, the following is happening in the sense circuit. The first state is the steady state for the sense circuit, in which it holds the current state in the half-latch structure created by FETs P1, N14, and N15, and inverter 128, 431, 435, 433, 437. The second state is the precharge state, in which the latch feedback loop is broken by turning off n-FET N15 433 and the node sense node is precharged via p-FET P8 445. The third state is the fuse sense state, where n-FET N1 447 is turned on and the voltage divider is set up between p-FETs P8/P1 445/431 and the polysilicon fuse through n-FETs N1 and N4 447, 449. The inverter 128 437 and p-FET P1 431 are then used to sense the state of the fuse.

One or more embodiments employ a "shadow" latch added to the control logic, to address negative bias temperature instability in P1 431. This shadow latch is external to the circuit shown in FIG. 4B, and has its data input tied to the fuse out (Fout) pin in FIG. 4B. In addition to the shadow latch, there is an additional operation performed to clear the half latch. Clearing this half latch is described by the state-machine sequence in the following table:

| Time | Pre-charge | Sense b and pre-charge | Fuse sense 1 | Fuse sense 2 | Blow fuse | Blow enable |
|---|---|---|---|---|---|---|
| 0 | 1 | 1 | 0 | 0 | 0 | 0 |
| 1 | 1 | 0 | 1 | 1 | 1 | 1 |
| 2 | 1 | 1 | 0 | 0 | 1 | 1 |
| 3 | 1 | 1 | 0 | 0 | 0 | 0 |

During this input signal sequence, the following is happening in the sense circuit. The first state is the steady state for the sense circuit, in which it holds the current state in the half-latch structure created by FETs P1, N14, and N15, and inverter 128, 431, 435, 433, 437. The second state is the precharge state, in which the latch feedback loop is broken by turning off n-FET N15 433 and the node sense node is precharged via p-FET P8 445. The third state is the fuse sense state, in which n-FET N1 447 is turned on and the voltage divider is set up between p-FETs P8/P1 445/431 and the polysilicon fuse through n-FETs N1 and N4 447, 449. The inverter 128 437 and p-FET P1 431 are then used to sense the state of the fuse.

For completeness, note that in blow circuit 401, the blow fuse and blow enable signals are applied as inputs to NAND gate 405, the output of which is the input to inverter 407. The output of inverter 407 connects to the gate of transistor N0 409.

Figure 5:
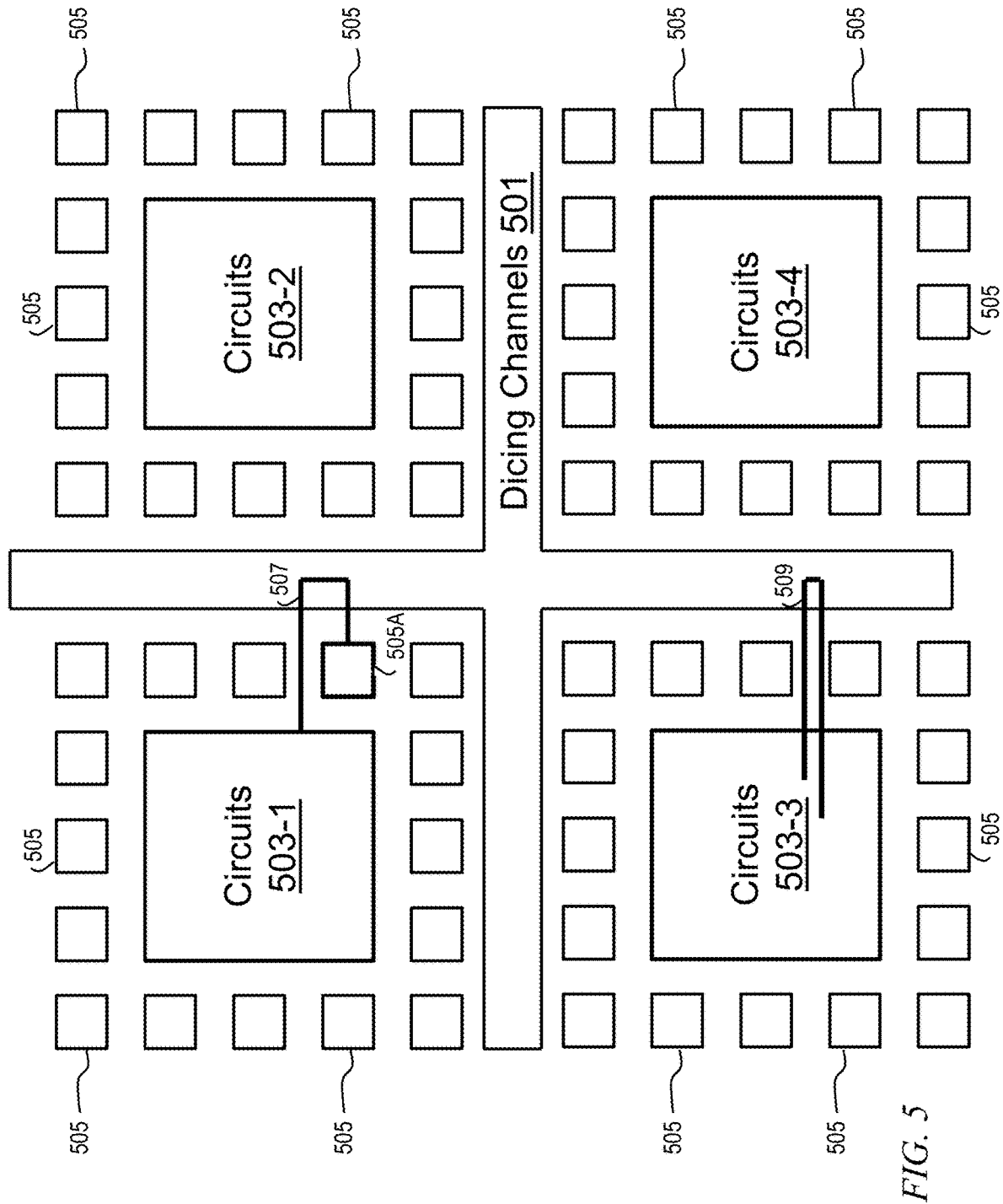
FIG. 5 shows techniques for write disabling, in accordance with aspects of the invention.

FIG. 5 shows several exemplary techniques for write disabling. Note a plurality of circuits 503-1, 503-2, 503-3, 503-4, . . . (collectively, 503). Each is surrounded by a plurality of pads 505; not every pad 505 is numbered so as to avoid clutter. One particular pad 505A is a write enable pad of interest; the connection 507 to the write enable pad, which goes to the tester, passes through the dicing channel 501. After test, and writing the key to the ROM, the dicing disconnects the line 507 to the write enable pin, and thus prevents any further writing. In another approach, the internal line 509 that enables the write operation to the ROM, can be routed through the dicing channel 501, and thus disable any further writing to the memory after the dicing process is completed. Please note that for illustrative convenience, in FIG. 5, both techniques are shown being used on different circuits on the same wafer. However, in a more typical case, all circuits on the same wafer could use one or the other of those techniques.

Given the discussion thus far, it will be appreciated that, in general terms, an exemplary method, according to an aspect of the invention, uses a public-private key pair with a corresponding identity. The public-private key pair can be generated using known techniques. One step includes writing a private key of such a pair to an integrated circuit 269 including a processor 295, a non-volatile memory 297, and a cryptographic engine 299 coupled to the processor and the non-volatile memory. The private key is written to the non-volatile memory 297, and the integrated circuit 269 is implemented in complementary metal-oxide semiconductor 14 nm or smaller technology. A further step includes permanently modifying the integrated circuit, subsequent to the writing, such that further writing to the non-volatile memory is disabled and such that the private key can be read only by the cryptographic engine 299 and not off-chip. Techniques for such permanent modification include, for example, the use of fuses as shown in FIGS. 4A and 4B and running lines through dicing channels for subsequent destruction, as shown in FIG. 5.

In the writing step, the non-volatile memory is preferably dedicated to the private key, since writing is disabled afterwards; however, this is not a requirement.

One or more embodiments further include inducing a threshold voltage shift in transistors of the non-volatile memory, subsequent to the writing, to inhibit at least one of reverse engineering and tampering.

One or more embodiments further include inducing oxide breakdown in transistors of the non-volatile memory, subsequent to the writing, to inhibit at least one of reverse engineering and tampering.

One or more embodiments further include encoding the private key in the non-volatile memory using two-bit encoding, during the writing, to inhibit at least one of reverse engineering and tampering.

In one or more instances, further steps include, subsequent to the permanent modification, providing the private key from the non-volatile memory 297 to the cryptographic engine 299; and using the private key from the non-volatile memory to respond to a challenge question, using the private key from the non-volatile memory to carry out decryption, and/or using the private key from the non-volatile memory to carry out encryption.

In one or more embodiments, the writing is carried out with a write circuit of the non-volatile memory, and the permanent modification of the integrated circuit such that further writing to the non-volatile memory is disabled includes disabling the write circuit with an electrical fuse (see FIGS. 4A and 4B and accompanying text).

In one or more embodiments, the writing is carried out with a dedicated pin of the non-volatile memory, and the permanent modification of the integrated circuit such that further writing to the non-volatile memory is disabled includes removing the dedicated pin (see FIG. 5 and accompanying text; e.g., by removing connecting line thereto during dicing process).

In another aspect, an exemplary integrated circuit 269 includes a processor 295; a non-volatile memory 297; and a cryptographic engine 299 coupled to the processor and the non-volatile memory. The integrated circuit 269 is implemented in complementary metal-oxide semiconductor 14 nm or smaller technology. The integrated circuit is permanently configured such that further writing to the non-volatile memory, beyond the private key, is disabled (e.g., by blowing a fuse or dicing away connecting lines as described elsewhere herein). The integrated circuit is permanently configured such that the private key can be read only by the cryptographic engine and not off-chip.

The non-volatile memory is preferably dedicated to the private key, since writing is disabled afterwards; however, this is not a requirement.

In some cases, the non-volatile memory includes metal oxide semiconductor field effect transistors having dielectrics, and the dielectrics have charges trapped therein to provide a threshold voltage shift in the transistors, to inhibit reverse engineering.

In some cases, the non-volatile memory includes metal oxide semiconductor field effect transistors exhibiting oxide breakdown to inhibit reverse engineering.

In some cases, the private key is encoded in the non-volatile memory using two-bit encoding, to inhibit reverse engineering.

Some embodiments include a write circuit of the non-volatile memory, isolated by a blown electrical fuse as shown in FIGS. 4A and 4B.

In still another aspect, referring to FIG. 5, an exemplary wafer (e.g. a semiconductor wafer) has a plurality of integrated circuits 503 formed thereon and separated from each other by dicing channels 501. Each of the integrated circuits in turn includes a processor; 295 a non-volatile memory 297 storing a private key of a public-private key pair; and a cryptographic engine 299 coupled to the processor and the non-volatile memory. The integrated circuit is implemented in complementary metal-oxide semiconductor 14 nm or smaller technology, and is configured such that circuitry enabling writing to the non-volatile memory (e.g. 507, 509) runs through a given one of the dicing channels 501 for destruction upon subsequent dicing. The integrated circuit is also configured such that the private key can be read only by the cryptographic engine and not off-chip, subsequent to the dicing.

Again, the non-volatile memory of each circuit 503 is preferably dedicated to the private key, since writing is disabled afterwards; however, this is not a requirement.

In yet another aspect, an integrated circuit 269 includes a processor 295; a non-volatile memory 297 storing a private key of a public-private key pair; a cryptographic engine 299 coupled to the processor and the non-volatile memory; and an unblown electrical fuse structure (as discussed elsewhere herein). The integrated circuit is implemented in complementary metal-oxide semiconductor 14 nm or smaller technology, and is configured such that further writing to the non-volatile memory, beyond the private key, is disabled when the fuse structure is blown. The integrated circuit is further configured such that subsequent to blowing of the fuse structure, the private key can be read only by the cryptographic engine 299 and not off-chip.

Yet again, the non-volatile memory is preferably dedicated to the private key, since writing is disabled afterwards; however, this is not a requirement.

As noted, some aspects of the invention or elements thereof can be implemented, at least in part, in the form of a computer program product including a computer readable storage medium with computer usable program code for performing appropriate method steps (e.g., key generation, control of fuse-blowing or semiconductor fabrication processes). Furthermore, one or more embodiments of the invention or elements thereof can be implemented, at least in part, using a system (or apparatus) including a memory, and at least one processor that is coupled to the memory and operative to perform appropriate method steps (e.g., key generation, control of fuse-blowing or semiconductor fabrication processes). Furthermore, aspects of the invention could be used to provide an encryption engine for such an apparatus or system.

Figure 6:
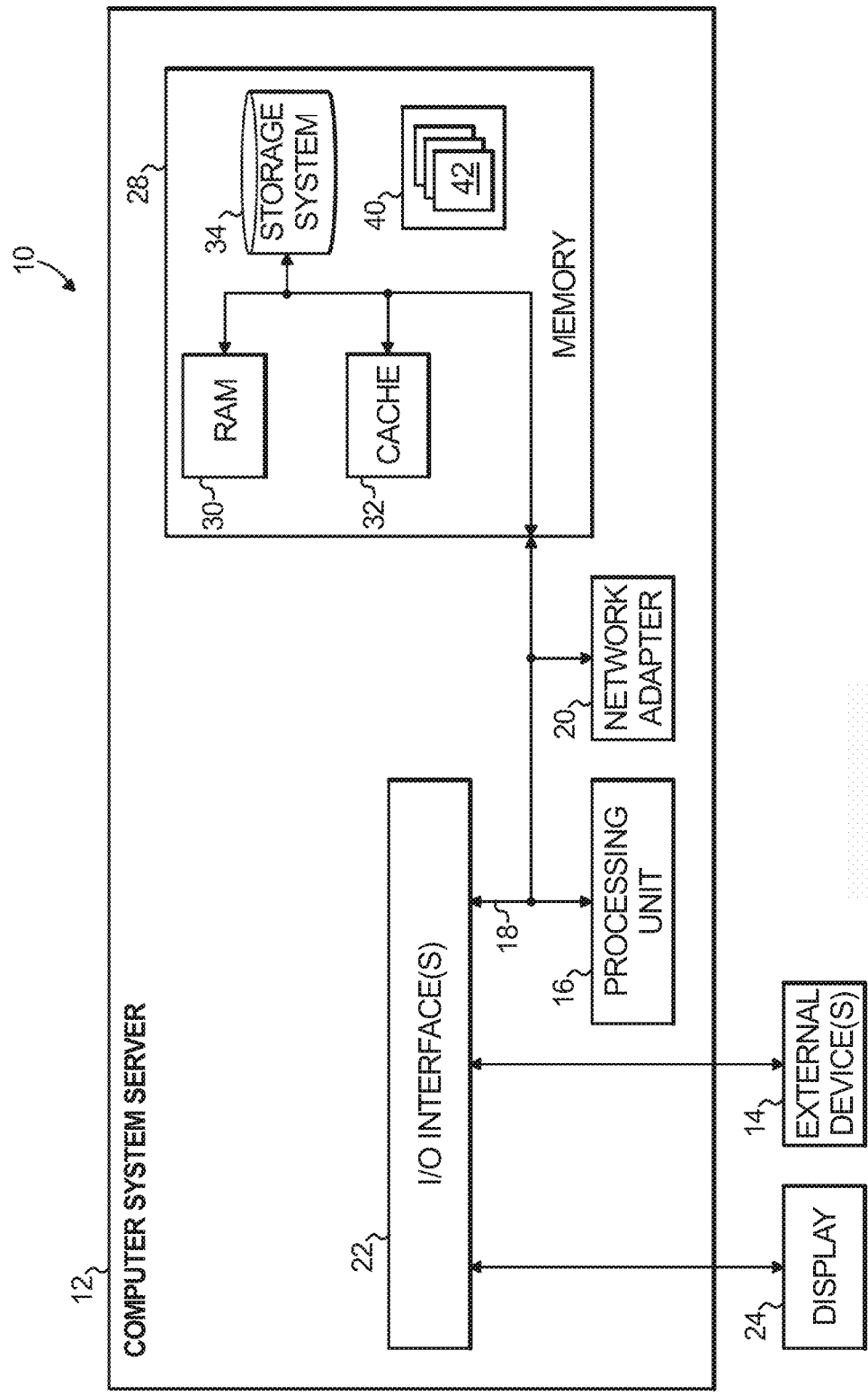

FIG. 6 depicts a computer system that may be useful in implementing one or more aspects and/or elements of the invention. In system 10 there is a computer system/server 12, which is potentially operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types.

As shown in FIG. 6, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of at least a portion of some embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of at least a portion of some embodiments of the invention.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, at least a portion of some embodiments can make use of software running on a general purpose computer or workstation. With reference to FIG. 6, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the at least a portion of some aspects of the invention may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters. This described functionality is also generally representative of aspects used to control external systems and/or to output generated key pairs to external systems.

As used herein, including the claims, a "server" includes a physical data processing system (for example, system 12 as shown in FIG. 6) running a server program. It will be understood that such a physical server may or may not include a display and keyboard.

It should be noted that at least a portion of some aspects of techniques described herein can include an additional step of providing a system comprising distinct software modules embodied on a computer readable storage medium; the modules can include, for example, modules to carry out any one, some, or all of the functionality described. Those method steps thereby implemented can then be carried out using the distinct software modules and/or sub-modules of the system, as described above, executing on one or more hardware processors such as 16. Further, a computer program product can include a computer-readable storage medium with code adapted to be implemented to carry out at least a portion of some functionality described herein, including the provision of the system with the distinct software modules.

One example of user interface that could be employed in some cases is hypertext markup language (HTML) code served out by a server or the like, to a browser of a computing device of a user. The HTML is parsed by the browser on the user's computing device to create a graphical user interface (GUI).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A wafer having a plurality of integrated circuits formed thereon and separated from each other with dicing channels, each of said integrated circuits in turn comprising:
    a processor;
    a non-volatile memory storing a private key of a public-private key pair; and
    a cryptographic engine coupled to said processor and said non-volatile memory;
    wherein:
        said integrated circuit is implemented in complementary metal-oxide semiconductor 14 nm or smaller technology;
        said integrated circuit is configured such that circuitry enabling writing to said non-volatile memory runs through a given one of said dicing channels for destruction upon subsequent dicing; and
        said integrated circuit is configured such that said private key can be read only by said cryptographic engine and not off-chip, subsequent to said dicing.

2. The wafer of claim 1, wherein in each of said integrated circuits, said non-volatile memory is dedicated to said private key.

* * * * *